United States Patent
Qiao et al.

(10) Patent No.: US 9,181,419 B2
(45) Date of Patent: Nov. 10, 2015

(54) TOUGHENED PLASTICS AND ITS PREPARATION METHOD

(75) Inventors: Jinliang Qiao, Beijing (CN); Yigun Liu, Beijing (CN); Shijun Zhang, Beijing (CN); Xiaohong Zhang, Beijing (CN); Jianming Gao, Beijing (CN); Wei Zhang, Beijing (CN); Genshuan Wei, Beijing (CN); Jingbo Shao, Beijing (CN); Hua Yin, Beijing (CN); Renli Zhai, Beijing (CN); Zhihai Song, Beijing (CN); Fan Huang, Beijing (CN)

(73) Assignees: CHINA PETROLEUM AND CHEMICAL CORPORATION, Beijing (CN); CHINA PETROLEUM AND CHEMICAL CORPORATION BEIJING RESEARCH INSTITUTE OF CHEMICAL INDUSTRY, Beijing (CN)

( * ) Notice: Subject to any disclaimer, the term of this patent is extended or adjusted under 35 U.S.C. 154(b) by 1008 days.

(21) Appl. No.: 10/415,769

(22) PCT Filed: Nov. 5, 2001

(86) PCT No.: PCT/CN01/01531
§ 371 (c)(1),
(2), (4) Date: Sep. 19, 2003

(87) PCT Pub. No.: WO02/36664
PCT Pub. Date: May 10, 2002

(65) Prior Publication Data
US 2004/0077792 A1 Apr. 22, 2004

(30) Foreign Application Priority Data
Nov. 3, 2000 (CN) .................................. 00 1 30385

(51) Int. Cl.
| | | |
|---|---|---|
| *C08L 23/12* | (2006.01) | |
| *C08L 23/16* | (2006.01) | |
| *C08L 25/04* | (2006.01) | |
| *C08L 21/00* | (2006.01) | |
| C08L 25/06 | (2006.01) | |
| C08L 25/10 | (2006.01) | |
| C08L 25/12 | (2006.01) | |

(52) U.S. Cl.
CPC .................. *C08L 21/00* (2013.01); *C08L 23/12* (2013.01); *C08L 23/16* (2013.01); *C08L 25/06* (2013.01); *C08L 25/10* (2013.01); *C08L 25/12* (2013.01); *C08L 2205/03* (2013.01); *C08L 2207/02* (2013.01)

(58) Field of Classification Search
CPC ......... C08L 23/16; C08L 25/10; C08L 25/06; C08L 23/12; C08L 21/00
USPC ......... 525/232, 236, 240, 239, 280, 241, 220, 525/222, 238; 526/240, 241, 232; 524/582, 524/567, 577, 560, 563, 565, 566, 583, 578
See application file for complete search history.

(56) References Cited

U.S. PATENT DOCUMENTS

| | | | | | |
|---|---|---|---|---|---|
| 3,130,177 | A | * | 4/1964 | Grabowski | 525/67 |
| 3,838,490 | A | * | 10/1974 | Willem | 29/760 |
| 3,865,354 | A | * | 2/1975 | Burpulis et al. | 366/76.2 |
| 4,161,472 | A | * | 7/1979 | Lehr | 524/504 |
| 4,518,515 | A | * | 5/1985 | Ott et al. | 525/79 |
| 4,535,124 | A | * | 8/1985 | Binsack et al. | 525/67 |
| 4,778,850 | A | * | 10/1988 | Lindner et al. | 525/80 |
| 4,788,250 | A | * | 11/1988 | Kitahara et al. | 525/67 |
| 5,010,135 | A | * | 4/1991 | Eckel et al. | 525/63 |
| 5,073,447 | A | * | 12/1991 | Mizuno et al. | 428/327 |
| 5,093,423 | A | * | 3/1992 | Bayan et al. | 525/99 |
| 5,266,634 | A | * | 11/1993 | Ito et al. | 525/67 |
| 5,502,095 | A | * | 3/1996 | Ueshima et al. | 524/269 |
| 5,631,323 | A | * | 5/1997 | Guntherberg et al. | 525/71 |
| 5,916,952 | A | * | 6/1999 | Romenesko et al. | 524/493 |
| 6,423,760 | B1 | * | 7/2002 | Qiao et al. | 522/150 |
| 6,803,398 | B1 | * | 10/2004 | Ito et al. | 524/114 |
| 6,838,490 | B2 | * | 1/2005 | Zhang et al. | 522/148 |
| 6,998,438 | B2 | * | 2/2006 | Qiao et al. | 525/64 |
| 7,491,757 | B2 | * | 2/2009 | Qiao et al. | 524/81 |
| 2003/0088036 | A1 | * | 5/2003 | Huang et al. | 525/523 |

FOREIGN PATENT DOCUMENTS

| | | | | | |
|---|---|---|---|---|---|
| EP | 146 172 | A1 | * | 11/1984 | C08J 3/00 |
| EP | 232 139 | A2 | * | 8/1987 | C08F 291/02 |
| EP | 1 022 311 | A1 | * | 7/2000 | C08L 51/00 |

OTHER PUBLICATIONS van Ginsbergen, J.G.M.; Borgmans, C.P.J.H.; van der Sanden, M.C.M.; Lemstra, P.J. Polymer Communications, 1990, 31, 162-164.*
Polymer International, 1992, vol. 29, No. 3, p. 229-247.

(Continued)

*Primary Examiner* — Rip A Lee
(74) *Attorney, Agent, or Firm* — Ohlandt Greeley Ruggiero & Perle L.L.P.

(57) ABSTRACT

A toughened plastic and its preparation method, with the toughened plastic being obtained by rubber-plastic blending of brittle or less brittle plastics and a rubber mixture. The rubber mixture consists of powdery rubbers having a cross-linked structure and an average particle size of not more than 0.50 μm, and at least one selected from the group consisting of unvulcanized rubbers and thermoplastic elastomers. The morphology and the particle size distribution of the rubber phase contained in the toughened plastic can be controlled by changing the particle size of the powdery rubbers having a cross-linking structure and choosing proper unvulcanized rubbers or thermoplastic elastomers. The toughened plastic has good toughness and processability while keeping better strength and stiffness.

8 Claims, No Drawings

(56) References Cited

OTHER PUBLICATIONS

Chapiro, Adolphe; "*Radiation Chemistry of Polymeric Systems*";Interscience Publishers, 1962, pp. 456-449.
Dole, Malcolm, "*The Radiation Chemistry of Macromolecules*"; Academic Press, 1973, vol. II, pp. 34-35.
Sing, et al., "*Radiation Processing of Polymers*";Hanser Publishers, 1992, Chapter 4, pp. 52-62.
Van Gisbergen, et al., "*Impact Behaviour of polystyrene/EPDM-rubber blends: Influence of electron beam irradiation*", Polymer Communications, May 1990, vol. 31, pp. 163-164.
Steller, et al., "*Crystalline structure of polypropylene in blends with thermoplastic elastomers after electron beam irradiation*", Radiation Physics and Chemistry, 2006, pp. 259-267.

\* cited by examiner

TOUGHENED PLASTICS AND ITS PREPARATION METHOD

TECHNICAL FIELD OF THE INVENTION

The present invention relates to toughened plastics and preparation thereof. More particularly, the present invention relates to toughened plastics obtained by blending brittle or less brittle plastics with two or more rubber components and to preparation thereof.

BACKGROUND OF THE INVENTION

As described in the article written by Souheng Wu of DuPont, USA (Polymer International, Vol. 29, No. 3, p 229-247 (1992)), plastics may be classified into pseudoductile plastics and brittle plastics. More particularly, plastics with a chain entanglement density (Ve) of less than 0.15 mmol/ml and a chain characteristic ratio (C) of larger than 7.5 belong to brittle plastics, which dissipate the external impact energy mainly by means of crazes from the matrix. The specific examples of brittle plastics are polystyrene, polymethyl methacrylate, acrylonitrile-styrene resins and the like. On the other hand, plastics with a chain entanglement density (Ve) of not less than 0.15 mmol/ml and a chain characteristic ratio (C) of not more than 7.5 belong to pseudoductile plastics, which dissipate the external impact energy mainly by generating the shear yielding from the matrix. With respect to the plastics between pseudoductile ones and brittle ones and pseudoductile plastics having a chain entanglement density (Ve) of about 0.15 mmol/ml, the present inventors define them in the specification as "less brittle plastics". The specific examples of less brittle plastics are polyvinyl chloride, polypropylene, polyformaldehyde and the like.

It is well known in the prior art that brittle or less brittle plastics can be toughened by incorporating a rubber into the polymerization system during the preparation of the plastics. For example, high-impact polystyrene toughened by rubber particles having a "salami" structure can be prepared by dissolving a cis-1,4-polybutadiene rubber in styrene monomer and then polymerizing said monomer. However, such a method is relatively complicated and is not necessarily suitable for other types of brittle plastics. Another method for toughening brittle or less brittle plastics involves melt-blending rubbers with plastics, i.e. toughening brittle or less brittle plastics by incorporating unvulcanized rubbers or thermoplastic elastomers. The specific example of such a method is to toughen polypropylene with ethylene-propylene rubbers. In such a method, it is very difficult to effectively control the dispersing state of the rubbers in the plastic matrix, since the morphology of the rubber particles in the plastic matrix and their distribution largely affect the toughening effect, which renders the toughening effect undesirable. Moreover, more rubbers are normally needed to be incorporated so as to achieve a desirable toughening effect, which will largely deteriorate the properties of the plastics, such as strength, stiffness and the like.

SUMMARY OF THE INVENTION

After carrying out extensive and intensive researches, the present inventors found that an excellent toughening effect can be achieved by incorporating powdery rubbers having a relatively small particle size and a cross-linked structure, in combination with unvulcanized rubbers and/or thermoplastic elastomers, into brittle or less brittle plastics, and that such a method is suitable for toughening various brittle or less brittle plastics.

Therefore, an object of the present invention is to provide toughened plastics obtained by incorporating a rubber mixture into brittle or less brittle plastics. Such toughened plastics have good toughness, while retaining relatively high strength and stiffness.

Another object of the present invention is to provide a method for toughening brittle or less brittle plastics. The method according to the present invention can be carried out in a simple manner and is suitable for toughening various brittle or less brittle plastics.

The present invention in its one aspect provides toughened plastics, comprising brittle or less brittle plastics and a rubber mixture, blended with each other, wherein the rubber mixture consists of a powdery rubber having a cross-linked structure and an average particle size in the range of 0.02 μm to 0.50 μm, and at least one selected from the group consisting of unvulcanized rubbers and thermoplastic elastomers.

The present invention in its another aspect provides a method for preparing the toughened plastics according to the present invention, comprising melt-blending brittle or less brittle plastics with said rubber mixture.

DETAILED DESCRIPTION OF THE INVENTION

The toughened plastics according to the present invention comprise brittle or less brittle plastics and a rubber mixture, blended with each other, wherein the rubber mixture consists of a powdery rubber having a cross-linked structure and an average particle size in the range of 0.02 μm to 0.50 μm, preferably 0.05 μm to 0.20 μm, and at least one selected from the group consisting of unvulcanized rubbers and thermoplastic elastomers. In the toughened plastics according to the present invention, the unvulcanized rubbers and the thermoplastic elastomers can be mixed at any ratio. The weight ratio of the rubber mixture to the plastic is from 1:99 to 30:70, preferably from 5:95 to 25:75. The proportion of the powdery rubber is from 10% to 95% by weight, preferably from 50% to 95% by weight, based on the total weight of the rubber mixture.

In the toughened plastics according to the present invention, the brittle or less brittle plastics to be used as the matrix may include polystyrene, acrylonitrile-styrene resins (AS), polyvinyl acetate, polymethyl methacrylate, polyvinyl chloride, polypropylene or polyformaldehyde.

In the rubber mixture as the dispersed phase of the toughened plastics according to the present invention, the powdery rubber particles having a cross-linked structure are those having a homogeneous structure; a gel content of 60 percent by weight or more, preferably 80% by weight or more; and an average particle size in the range of 0.02 μm to 0.50 μm, preferably 0.05 μm to 0.20 μm.

Preferably, such rubber particles are fully vulcanized powdery rubbers prepared according to Chinese Patent Application No. 99125530.5 filed by the present applicants on Dec. 3, 1999 (its full text is incorporated herein by reference). For example, in the present fully vulcanized powdery rubber, each particle is homogeneous, that is to say, the individual particle is uniform with respect to the composition, and a heterogeneous phenomenon, such as lamellar phase and phase-separation, etc., within the particles is not detectable with microscopy available nowadays. In addition, such rubber particles particularly include, but not limited to, at least one fully vulcanized powdery rubber selected from the group consisting of fully vulcanized powdery natural rubber, fully vulcanized powdery styrene-butadiene rubber, fully vulcanized powdery carboxylated styrene-butadiene rubber, fully vulcanized powdery acrylonitrile-butadiene rubber, fully vulcanized powdery carboxylated acrylonitrile-butadiene rubber, fully vulcanized powdery polybutadiene rubber, fully vulcanized powdery chloroprene rubber, fully vulcanized powdery silicone rubber, fully vulcanized powdery acrylic rubber and the like. Fully vulcanized powdery rubbers mean separate, fine rubber powders which have a gel content of 60 percent by weight or more and are freely flowing after drying without any partitioning agents. Such fully vulcanized powdery rubbers can be obtained by irradiating rubber latexes to cross-link them, as described in the above-mentioned Chinese Patent Application No. 99125530.5.

Cross-linked powdery rubbers can also be used as the rubber particles mentioned above.

After a series of experiments, the present inventors found that some rubber latexes undergo a certain degree of cross-linking between the rubber molecules during their synthesis, which results in rubber latexes having a certain degree of cross-linking. Such rubber latexes are referred to as cross-linked rubber latexes. If such rubber latexes are per se cross-linked to a higher degree, powdery rubbers can be obtained therefrom by spray drying without further irradiation cross-linking. Of course, such powdery rubbers have a lower cross-linking degree than fully vulcanized powdery rubbers obtained by irradiation for the same type of rubbers, thus the former is referred to as cross-linked powdery rubbers.

Such cross-linked powdery rubbers have a gel content substantially same as that of the starting cross-linked synthetic rubber latexes, for example 80% by weight or more, preferably 85% by weight or more. Such powdery rubbers have a smaller particle size, for example in the range of 50 nm to 300 nm on average. The cross-linked powdery rubbers can freely flow without any partitioning agents. Of course, partitioning agents can be added to such rubbers, if needed, in order to further enhance their flowability and antiblocking. Each particles present in such powdery rubbers are homogeneous, i.e., individual particles are homogeneous in their composition and no heterogeneous phenomena, such as demixing, phase separation or the like can be observed in the particles by current microscopic technologies. There is no specific restriction on the type of the cross-linked powdery rubbers, and they can be those prepared from various cross-linked synthetic rubber latexes, such as cross-linked powdery styrene-butadiene rubber, cross-linked powdery carboxylated styrene-butadiene rubber, cross-linked powdery polybutadiene rubber, cross-linked powdery acrylonitrile-butadiene rubber, cross-linked powdery carboxylated acrylonitrile-butadiene rubber, cross-linked powdery chloroprene rubber, cross-linked powdery acrylic rubber and the like.

The cross-linked powdery rubbers mentioned as above can be prepared directly by drying various starting cross-linked synthetic rubber latexes. The drying can be carried out by spray drying or precipitation drying, preferably spray drying. In the case of spray drying, the inlet and outlet temperatures of the spray drier can be controlled at 100 to 200° C. and 20 to 80° C., respectively. Any kind of cross-linked synthetic latexes can be used for the preparation of cross-linked powdery rubbers, provided that they have a gel content of 80% by weight or more, preferably 85% by weight or more. Cross-linked synthetic latexes can be selected from the group consisting of cross-linked styrene-butadiene latex, cross-linked carboxylated styrene-butadiene latex, cross-linked polybutadiene latex, cross-linked acrylonitrile-butadiene latex, cross-linked carboxylated acrylonitrile-butadiene latex, cross-linked neoprene latex and cross-linked acrylic latex.

When such cross-linked powdery rubbers are used as the rubber particles in the toughened plastics according to the present invention, cross-linked powdery styrene-butadiene rubber, cross-linked powdery polybutadiene rubber or the like is preferred.

The unvulcanized rubbers used in the rubber mixture as the dispersed phase of the toughened plastics according to the present invention may be at least one selected from the group consisting of natural rubbers, styrene-butadiene rubbers, carboxylated styrene-butadiene rubbers, polybutadiene rubbers, polyisoprene rubbers, ethylene-propylene rubbers, chloroprene rubbers, acrylonitrile-butadiene rubbers, carboxylated acrylonitrile-butadiene rubbers, butyl rubbers, acrylic rubbers, silicone rubbers, fluorine rubbers, polyurethane rubbers, epichlorohydrin rubbers, polysulfide rubbers, chlorosulfonated polyethylenes or chlorinated polyethylenes.

The thermoplastic elastomers used in the rubber mixture as the dispersed phase of the toughened plastics according to the present invention may be at least one selected from the group consisting of styrene-butadiene-styrene block copolymers (SBS), styrene-isoprene-styrene block copolymers (SIS), hydrogenated SBS (SEBS), hydrogenated SIS (SEPS), polyether polyurethane thermoplastic elastomers, polyester polyurethane thermoplastic elastomers, polyester type thermoplastic elastomers, ethylene copolymer thermoplastic elastomers and polyvinyl chloride thermoplastic elastomers. Both the unvulcanized rubbers and the thermoplastic elastomers mentioned as above may be used, individually or in any combinations, as one of the constituents of the rubber mixture.

The toughened plastics according to the present invention can be prepared as follows.

Brittle or less brittle plastics are blended with the rubber mixture by a method conventionally used for rubber-plastic blending, to obtain the toughened plastics according to the present invention. The rubber mixture to be used consists of a powdery rubber having a cross-linked structure and an average particle size of 0.02 μm to 0.50 μm, preferably 0.05 μm to 0.20 μm, and at least one selected from the group consisting of unvulcanized rubbers and thermoplastic elastomers, wherein the unvulcanized rubbers can be mixed with the thermoplastic elastomers at any ratio. The weight ratio of the rubber mixture to the plastic is from 1:99 to 30:70, preferably from 5:95 to 25:75, and the proportion of the powdery rubber is from 10% to 95% by weight, preferably from 50% to 95% by weight, based on the total weight of the rubber mixture.

The brittle or less brittle plastics which may be used in the method according to the present invention include polystyrene, acrylonitrile-styrene resins (AS), polyvinyl acetate, polymethyl methacrylate, polyvinyl chloride, polypropylene or polyformaldehyde.

The powdery rubber particles having a cross-linked structure, which may be used in the method according to the present invention, are those having a homogeneous structure; a gel content of 60% by weight or more, preferably 80% by weight or more; and an average particle size of 0.02 μm to 0.50 μm, preferably 0.05 μm to 0.20 μm.

Such rubber particles are fully vulcanized powdery rubbers prepared according to Chinese Patent Application No. 99125530.5 filed by the present applicants on Dec. 3, 1999 (its full text is incorporated herein by reference), which particularly include, but not limited to, at least one fully vulcanized powdery rubber selected from the group consisting of fully vulcanized powdery natural rubber, fully vulcanized powdery styrene-butadiene rubber, fully vulcanized powdery carboxylated styrene-butadiene rubber, fully vulcanized powdery acrylonitrile-butadiene rubber, fully vulcanized powdery carboxylated acrylonitrile-butadiene rubber, fully vulcanized powdery polybutadiene rubber, fully vulcanized powdery chloroprene rubber, fully vulcanized powdery silicone rubber, fully vulcanized powdery acrylic rubber and the like. Fully vulcanized powdery rubbers mean separate, fine rubber powders which have a gel content of 60 percent by weight or more and are freely flowing after drying without any partitioning agents. Such fully vulcanized powdery rubbers can be obtained by irradiating rubber latexes to cross-link them, as described in the above-mentioned Chinese Patent Application No. 99125530.5.

The rubber particles can also be cross-linked powdery rubbers.

After a series of experiments, the present inventors found that some rubber latexes undergo a certain degree of cross-linking between the rubber molecules during their synthesis, which results in rubber latexes having a certain degree of cross-linking. Such rubber latexes are referred to as cross-linked rubber latexes. If such rubber latexes are per se cross-linked to a higher degree, powdery rubbers can be obtained therefrom by spray drying without further irradiation cross-linking. Of course, such powdery rubbers have a lower cross-linking degree than fully vulcanized powdery rubbers obtained by irradiation for the same type of rubbers, thus the former is referred to as cross-linked powdery rubbers.

Such cross-linked powdery rubbers have a gel content substantially same as that of the starting cross-linked synthetic rubber latexes, for example 80% by weight or more, preferably 85% by weight or more. Such powdery rubbers have a smaller particle size, for example in the range of 50 nm to 300 nm on average. The cross-linked powdery rubbers can freely flow without any partitioning agents. Of course, partitioning agents can be added to such rubbers, if needed, in order to further enhance their flowability and antiblocking. Each particles present in such powdery rubbers are homogeneous, i.e., individual particles are homogeneous in their composition and no heterogeneous phenomena, such as demixing, phase separation or the like can be observed in the particles by current microscopic technologies. There is no specific restriction on the type of the cross-linked powdery rubbers, and they can be those prepared from various cross-linked synthetic rubber latexes, such as cross-linked powdery styrene-butadiene rubber, cross-linked powdery carboxylated styrene-butadiene rubber, cross-linked powdery polybutadiene rubber, cross-linked powdery acrylonitrile-butadiene rubber, cross-linked powdery carboxylated acrylonitrile-butadiene rubber, cross-linked powdery chloroprene rubber, cross-linked powdery acrylic rubber and the like.

The cross-linked powdery rubbers mentioned as above can be prepared directly by drying various starting cross-linked synthetic rubber latexes. The drying can be carried out by spray drying or precipitation drying, preferably spray drying. In the case of spray drying, the inlet and outlet temperatures of the spray drier can be controlled at 100 to 200° C. and 20 to 80° C., respectively. Any kind of cross-linked synthetic latexes can be used for the preparation of cross-linked powdery rubbers, provided that they have a gel content of 80% by weight or more, preferably 85% by weight or more. Cross-linked synthetic latexes can be selected from the group consisting of cross-linked styrene-butadiene latex, cross-linked carboxylated styrene-butadiene latex, cross-linked polybutadiene latex, cross-linked acrylonitrile-butadiene latex, cross-linked carboxylated acrylonitrile-butadiene latex, cross-linked neoprene latex and cross-linked acrylic latex.

When such cross-linked powdery rubbers are used as the rubber particles in the toughened plastics according to the present invention, cross-linked powdery styrene-butadiene rubber, cross-linked powdery polybutadiene rubber or the like is preferred.

The unvulcanized rubbers used in the method according to the present invention may be at least one selected from the group consisting of natural rubbers, styrene-butadiene rubbers, carboxylated styrene-butadiene rubbers, polybutadiene rubbers, polyisoprene rubbers, ethylene-propylene rubbers, chloroprene rubbers, acrylonitrile-butadiene rubbers, carboxylated acrylonitrile-butadiene rubbers, butyl rubbers, acrylic rubbers, silicone rubbers, fluorine rubbers, polyurethane rubbers, epichlorohydrin rubbers, polysulfide rubbers, chlorosulfonated polyethylenes or chlorinated polyethylenes.

The thermoplastic elastomers used in the method according to the present invention may be at least one selected from the group consisting of styrene-butadiene-styrene block copolymers (SBS), styrene-isoprene-styrene block copolymers (SIS), hydrogenated SBS (SEBS), hydrogenated SIS (SEPS), polyether polyurethane thermoplastic elastomers, polyester polyurethane thermoplastic elastomers, polyester type thermoplastic elastomers, ethylene copolymer thermoplastic elastomers and polyvinyl chloride thermoplastic elastomers. Both the unvulcanized rubbers and the thermoplastic elastomers mentioned as above may be used, individually or in any combinations, as one of the constituents of the rubber mixture.

During the preparation of the toughened plastics according to the present invention by means of a rubber-plastic blending method, the blending temperature is that conventionally used for processing plastics and can be determined depending on the melting temperature of the plastic matrix. However, the blending temperature should be selected in such a manner that the complete melting of the plastic matrix is ensured and no decomposition of plastics occurs. In addition, processing aids such as conventional additives, fillers, compatibilizers and the like can be added into the blending materials in a suitable amount, if needed.

The blending equipments used in the method according to the present invention can be those conventionally used for rubber-plastic processing, for example, a single-screw extruder, a twin-screw extruder, a two-roll mill, an internal mixer or the like.

The morphology and particle size distribution of the rubber phase contained in the toughened plastics according to the present invention can be controlled by changing the particle size of the powdery rubbers having a cross-linking structure and choosing proper unvulcanized rubbers or thermoplastic elastomers. The toughened plastic according to the present invention has good toughness and processability while retaining better strength and stiffness.

The method for toughening brittle or less brittle plastics according to the present invention can be carried out in a simple manner and is suitable for toughening various brittle or less brittle plastics.

EXAMPLES

The present invention is further described with reference to the following examples, which shall not be construed as limiting the present invention in any way. The scope of the present invention will be defined in the appended claims.

Example 1

Polypropylene pellets (manufactured by Jinan Refinery Factory, Shandong Province, China, Brand: T30S), a fully vulcanized powdery styrene-butadiene rubber[obtained as follows: in a styrene-butadiene latex (manufactured by Latex Research Center of Lanzhou Petrochemical Company, Gansu Province, China, Brand: DINGBEN-50), 3% by weight, based on the dry weight of the latex, of trimethylolpropane triacrylate is added as the cross-linking aid. The resulting mixture is vulcanized by means of irradiation with a dose of 2.5 Mrad and then is spray dried to obtain a powdery rubber having an average particle size of 100 nm and a gel content of 90.4% by weight. For details, see the Chinese Patent Application No. 99125530.5 as mentioned above], EPDM rubber pellets (manufactured by Dupont Dow Elastomers L. L. C., USA, Brand: 3745) and an antioxidant, Irganox 1010 (manufactured by Ciba-Geigy, Switzerland) are compounded at a weight ratio of polypropylene:the fully vulcanized powdery styrene-butadiene rubber:EPDM rubber of 90:9:1, with the amount of the antioxidant being 0.5 part per 100 parts by weight of the total weight of the rubbers and the plastic. The blending and pelleting are carried out in a ZSK-25 twin-screw extruder (Werner & Pfleiderer Co., Germany), with the temperatures for each section of the extruder being respectively 170° C., 185° C., 190° C., 190° C., 190° C. and 190° C. (die temperature). The pellets are injection-molded into standard test bars and then subjected to various tests of mechanical properties. The results are listed in Table 1.

Example 2

The procedure is same as in Example 1, except that the weight ratio of polypropylene:the fully vulcanized powdery styrene-butadiene rubber:EPDM rubber is 90:8:2. The mechanical properties are tested and the results are listed in Table 1.

Example 3

The procedure is same as in Example 1, except that the weight ratio of polypropylene:the fully vulcanized powdery styrene-butadiene rubber:EPDM rubber is 90:5:5. The mechanical properties are tested and the results are listed in Table 1.

Comparative Example 1

The procedure is same as in Example 1, except that no EPDM rubber is added and the weight ratio of polypropylene to the fully vulcanized powdery styrene-butadiene rubber is 90:10. The mechanical properties are tested and the results are listed in Table 1.

Comparative Example 2

The procedure is same as in Example 1, except that no fully vulcanized powdery styrene-butadiene rubber is added and the weight ratio of polypropylene to EPDM rubber is 90:10. The mechanical properties are tested and the results are listed in Table 1.

Comparative Example 3

The polypropylenes pellet as in Example 1 are directly injection-molded into standard test bars, and then subjected to various tests for mechanical properties. The results are listed in Table 1.

TABLE 1

| Unit | Tensile strength MPa | Elongation at break % | Notched Izod impact strength J/m | Flexural strength MPa | Flexural modulus GPa |
|---|---|---|---|---|---|
| Ex. 1 | 28.8 | 248 | 100.0 | 28.8 | 1.32 |
| Ex. 2 | 28.8 | 230 | 95.8 | 29.0 | 1.31 |
| Ex. 3 | 28.7 | 179 | 90.8 | 29.4 | 1.33 |
| Comp. Ex. 1 | 28.4 | 211 | 87.4 | 28.4 | 1.28 |
| Comp. Ex. 2 | 28.7 | 171 | 70.0 | 29.1 | 1.33 |
| Comp. Ex. 3 | 34.8 | 502 | 46.8 | 34.4 | 1.56 |
| Test Standard | GB1040 | GB1040 | GB1843 | GB9341 | GB9341 |

Example 4

Transparent polystyrene pellets (manufactured by Beijing Yanshan Petroleum and Chemical Co., China, Brand: 666D), a cross-linked powdery styrene-butadiene rubber (prepared as follows), an SBS thermoplastic elastomer (manufactured by Beijing Yanshan Petroleum and Chemical Co., China, Brand: 1401) and an antioxidant, Irganox 1010 (same as in Example 1) are compounded at a weight ratio of polystyrene: the cross-linked powdery styrene-butadiene rubber:the SBS thermoplastic elastomer of 85:13.5:1.5, with the amount of the antioxidant being 0.5 part per 100 parts by weight of the total weight of the rubbers and the plastic. The blending and pelleting are carried out in a ZSK-25 twin-screw extruder (Werner & Pfleiderer Co., Germany), with the temperatures for each section of the extruder being respectively 170° C., 180° C., 180° C., 180° C., 180° C. and 180° C. (die temperature). The pellets are injection-molded into standard test bars and then subjected to various tests of mechanical properties. The results are listed in Table 2.

The cross-linked powdery styrene-butadiene rubber used in this example is prepared as follows:

A styrene-butadiene latex having a certain degree of cross-linking per se (the rubber molecules undergo cross-linking reaction to a certain degree during the synthesis of the rubber latex, which results in a rubber latex having a certain degree of cross-linking) is spray dried by means of a spray drier, with the inlet and outlet temperatures of the spray drier being 140° C.-160° C. and 40° C.-60° C., respectively. The dried powdery styrene-butadiene rubber is then collected in a cyclone, thereby obtaining a cross-linked powdery styrene-butadiene rubber having a particle size of about 100 nm and a gel content of 88.9% by weight. The styrene-butadiene latex used herein is a cross-linked styrene-butadiene latex having a gel content of about 88% by weight (manufactured by Latex Research Center of Lanzhou Petrochemical Company, Gansu Province, China, Brand: DINGBEN-50).

Example 5

The procedure is same as in Example 4, except that the weight ratio of polystyrene:the cross-linked powdery styrene-butadiene rubber:the SBS thermoplastic elastomer is 85:12:3. The mechanical properties are tested and the results are listed in Table 2.

Example 6

The procedure is same as in Example 4, except that the weight ratio of polystyrene:the cross-linked powdery styrene-butadiene rubber:the SBS thermoplastic elastomer is 85:8:7. The mechanical properties are tested and the results are listed in Table 2.

Comparative Example 4

The procedure is same as in Example 4, except that no SBS thermoplastic elastomer is added and the weight ratio of polystyrene to the cross-linked powdery styrene-butadiene rubber is 85:15. The mechanical properties are tested and the results are listed in Table 2.

Comparative Example 5

The procedure is same as in Example 4, except that no cross-linked powdery styrene-butadiene rubber is added and the weight ratio of polystyrene to the SBS thermoplastic elastomer is 85:15. The mechanical properties are tested and the results are listed in Table 2.

Comparative Example 6

The polystyrene pellets as in Example 4 are directly injection-molded into standard test bars, and then subjected to various tests for mechanical properties. The results are listed in Table 2.

TABLE 2

| Unit | Tensile strength MPa | Elongation at break % | Notched Izod impact strength J/m | Flexural strength MPa | Flexural modulus GPa |
|---|---|---|---|---|---|
| Ex. 4 | 35.0 | 36 | 137 | 51.1 | 2.40 |
| Ex. 5 | 32.9 | 38 | 127 | 50.9 | 2.43 |
| Ex. 6 | 32.8 | 42 | 112 | 50.7 | 2.55 |
| Comp. Ex. 4 | 35.2 | 32 | 99.5 | 50.9 | 2.36 |
| Comp. Ex. 5 | 38.3 | 36 | 47.4 | 53.8 | 2.66 |
| Comp. Ex. 6 | 50.1 | 5 | 32.7 | 83.8 | 3.22 |
| Test Standard | GB1040 | GB1040 | GB1843 | GB9341 | GB9341 |

Example 7

An AS resin (manufactured by Qimei Inc., Taiwan, Brand: PN-127 L200), a fully vulcanized powdery styrene-butadiene rubber (same as in Example 1), an SIS thermoplastic elastomer (manufactured by Dow Exxon Chem. Co., Brand: 4113) and an antioxidant, Irganox 1010 (same as in Example 1) are compounded in a weight ratio of the AS resin:the fully vulcanized powdery styrene-butadiene rubber:the SIS thermoplastic elastomer of 80:18:2, together with calcium stearate (chemical pure grade, Beijing Changyang Chemical Factory, China) in an amount of 0.2 part per 100 parts by weight of the total weight of the rubbers and the plastic. The blending and pelleting are carried out in a ZSK-25 twin-screw extruder (Werner & Pfleiderer Co., Germany), with the temperatures for each section of the extruder being respectively 220° C., 240° C., 240° C., 240° C., 245° C. and 240° C. (die temperature). The pellets are injection-molded into standard test bars and then subjected to various tests of mechanical properties. The results are listed in Table 3.

Example 8

The procedure is same as in Example 7, except that the weight ratio of the AS resin:the fully vulcanized powdery styrene-butadiene rubber:the SIS thermoplastic elastomer is 80:16:4. The mechanical properties are tested and the results are listed in Table 3.

Example 9

The procedure is same as in Example 7, except that the weight ratio of the AS resin:the fully vulcanized powdery styrene-butadiene rubber:the SIS thermoplastic elastomer is 80:10:10. The mechanical properties are tested and the results are listed in Table 3.

Example 10

The procedure is same as in Example 7, except that the weight ratio of the AS resin:the fully vulcanized powdery styrene-butadiene rubber:the SIS thermoplastic elastomer is 80:4:16. The mechanical properties are tested and the results are listed in Table 3.

Example 11

The procedure is same as in Example 7, except that the weight ratio of the AS resin:the fully vulcanized powdery styrene-butadiene rubber:the SIS thermoplastic elastomer is 80:2:18. The mechanical properties are tested and the results are listed in Table 3.

Comparative Example 7

The procedure is same as in Example 7, except that no SIS thermoplastic elastomer is added and the weight ratio of the AS resin to the fully vulcanized powdery styrene-butadiene rubber is 80:20. The mechanical properties are tested and the results are listed in Table 3.

Comparative Example 8

The procedure is same as in Example 7, except that no fully vulcanized powdery styrene-butadiene rubber is added and the weight ratio of the AS resin to the SIS thermoplastic elastomer is 80:20. The mechanical properties are tested and the results are listed in Table 3.

Comparative Example 9

The AS pellets as in Example 7 are directly injection-molded into standard test bars, and then subjected to various tests for mechanical properties. The results are listed in Table 3.

TABLE 3

| Unit | Tensile strength MPa | Elongation at break % | Notched Izod impact strength J/m | Flexural strength MPa | Flexural strength GPa | Heat distortion temperature ° C. |
|---|---|---|---|---|---|---|
| Ex. 7 | 48.9 | 32.5 | 75.6 | 78.2 | 2.15 | 73.6 |
| Ex. 8 | 45.6 | 29.8 | 65.8 | 75.6 | 2.07 | 72.2 |
| Ex. 9 | 42.9 | 22.5 | 43.1 | 69.8 | 1.92 | 69.8 |
| Ex. 10 | 38.3 | 15.8 | 39.5 | 65.2 | 1.83 | 67.2 |
| Ex. 11 | 36.8 | 12.6 | 36.9 | 60.7 | 1.73 | 65.1 |
| Comp. Ex. 7 | 43.2 | 25.7 | 45.9 | 68.3 | 1.96 | 71.5 |
| Comp. Ex. 8 | 33.7 | 4.5 | 32.1 | 53.9 | 1.62 | 63.6 |
| Comp. Ex. 9 | 72.5 | 3.5 | 22.8 | 105.6 | 2.68 | 84.5 |

TABLE 3-continued

| Unit | Tensile strength MPa | Elongation at break % | Notched Izod impact strength J/m | Flexural strength MPa | Flexural strength GPa | Heat distortion temperature °C. |
|---|---|---|---|---|---|---|
| Test Standard | ASTM D638 | ASTM D638 | ASTM D256 | ASTM D790 | ASTM D790 | ASTM D648 |

The invention claimed is:

1. A toughened plastic comprising:
   a brittle plastic or a less brittle plastic; and
   a rubber mixture,
   wherein said brittle plastic has a chain entanglement density (Ve) of less than 0.15 mmol/ml and a chain characteristic ratio ($C_\infty$) of larger than 7.5,
   wherein said less brittle plastic is at least one selected from the group consisting of: polyvinyl chloride, polypropylene and polyformaldehyde,
   wherein said rubber mixture consists of a powdery rubber and at least one selected from the group consisting of: an unvulcanized rubber and a thermoplastic elastomer,
   wherein said powdery rubber has a cross-linked structure, a homogeneous structure, a gel content of 60% by weight or more, and an average particle size in a range of 0.02 μm to 0.50 μm,
   wherein a weight ratio of said rubber mixture to said brittle plastic or said less brittle plastic is from 1:99 to 30:70 and a proportion of said powdery rubber being from about 50% to 95% by weight, based on a total weight of said rubber mixture,
   wherein said powdery rubber is a fully vulcanized powdery rubber which is at least one selected from the group consisting of: fully vulcanized powdery natural rubber, fully vulcanized powdery styrene-butadiene rubber, fully vulcanized powdery carboxylated styrene-butadiene rubber, fully vulcanized powdery acrylonitrile-butadiene rubber, fully vulcanized powdery carboxylated acrylonitrile-butadiene rubber, fully vulcanized powdery polybutadiene rubber, fully vulcanized powdery chloroprene rubber, fully vulcanized powdery silicone rubber and fully vulcanized powdery acrylic rubber, and
   wherein said brittle plastic or said less brittle plastic is melt blended together with said rubber mixture.

2. The toughened plastic of claim 1, wherein said brittle plastic is selected from the group consisting of: polystyrene, acrylonitrile-styrene resins, polyvinyl acetate, and polymethyl methacrylate.

3. The toughened plastic of claim 1, wherein said powdery rubber has an average particle size in a range of 0.05 μm to 0.20 μm.

4. The toughened plastic of claim 1, wherein said powdery rubber has a gel content of 80% by weight or more.

5. The toughened plastic of claim 1, wherein the weight ratio of said rubber mixture to said brittle plastic or said less brittle plastic is from 5:95 to 25:75.

6. The toughened plastic of claim 1, wherein said unvulcanized rubber is one selected from the group consisting of: natural rubber, styrene-butadiene rubber, carboxylated styrene-butadiene rubber, polybutadiene rubber, polyisoprene rubber, ethylene-propylene rubber, chloroprene rubber, acrylonitrile-butadiene rubber, carboxylated acrylonitrile-butadiene rubber, butyl rubber, acrylic rubber, silicone rubber, fluorine rubber, polyurethane rubber, epichlorohydrin rubber, polysulfide rubber, chlorosulfonated polyethylene, and chlorinated polyethylene.

7. The toughened plastic of claim 1, wherein said thermoplastic elastomer is one selected from the group consisting: of styrene-butadiene-styrene block copolymer, styrene-isoprene-styrene block copolymer, hydrogenated SBS, hydrogenated SIS, polyether polyurethane thermoplastic elastomer, polyester polyurethane thermoplastic elastomer, polyester type thermoplastic elastomer, ethylene copolymer thermoplastic elastomer, and polyvinyl chloride thermoplastic elastomer.

8. The toughened plastic of claim 1, wherein said rubber mixture consists of said powdery rubber, said unvulcanized rubber, and said thermoplastic elastomer.

* * * * *